(12) United States Patent
Lu et al.

(10) Patent No.: US 9,067,391 B2
(45) Date of Patent: Jun. 30, 2015

(54) COATED BIAXIALLY ORIENTED FILM VIA IN-LINE COATING PROCESS

(76) Inventors: Pang-Chia Lu, Pittsford, NY (US); Brad M. Moncla, Lake Jackson, TX (US); Matthew J. Kalinowski, Freeland, MI (US)

(*) Notice: Subject to any disclaimer, the term of this patent is extended or adjusted under 35 U.S.C. 154(b) by 1159 days.

(21) Appl. No.: 12/024,551

(22) Filed: Feb. 1, 2008

(65) Prior Publication Data
US 2009/0197022 A1 Aug. 6, 2009

(51) Int. Cl.
| | |
|---|---|
| *B05D 3/12* | (2006.01) |
| *B21F 9/00* | (2006.01) |
| *B05D 7/04* | (2006.01) |
| *B32B 27/32* | (2006.01) |
| *C08J 5/18* | (2006.01) |
| *C09D 123/02* | (2006.01) |

(52) U.S. Cl.
CPC . *B32B 27/32* (2013.01); *B05D 3/12* (2013.01); *B05D 7/04* (2013.01); *C08J 5/18* (2013.01); *C08J 2423/02* (2013.01); *C09D 123/02* (2013.01)

(58) Field of Classification Search
CPC ........ B32B 27/32; B05D 7/04; C09D 123/02; C09D 123/025; C09D 123/0815; C08J 5/18; C08J 7/047
USPC .......................................... 427/171, 172, 173
See application file for complete search history.

(56) References Cited

U.S. PATENT DOCUMENTS

| | | | |
|---|---|---|---|
| 4,956,233 A | 9/1990 | Chu et al. | |
| 4,956,241 A | 9/1990 | Chu et al. | |
| 4,965,123 A * | 10/1990 | Swan et al. | 428/314.4 |
| 5,156,904 A | 10/1992 | Rice et al. | |
| 5,182,168 A | 1/1993 | Chu et al. | |
| 5,419,960 A | 5/1995 | Touhsaent | |
| 5,451,460 A | 9/1995 | Lu et al. | |
| 5,525,421 A | 6/1996 | Knoerzer | |
| 6,512,024 B1 | 1/2003 | Lundgard et al. | |
| 6,939,584 B2 | 9/2005 | Sankey et al. | |
| 6,979,495 B2 * | 12/2005 | Keung et al. | 428/476.1 |
| 2004/0191529 A1 | 9/2004 | Gillie | |
| 2005/0100754 A1 * | 5/2005 | Moncla et al. | 428/523 |
| 2005/0271888 A1 * | 12/2005 | Moncla et al. | 428/523 |
| 2005/0282027 A9 * | 12/2005 | Pellingra et al. | 428/515 |
| 2007/0036909 A1 | 2/2007 | Luo et al. | |

FOREIGN PATENT DOCUMENTS

| | | |
|---|---|---|
| EP | 0 059 555 | 9/1982 |
| WO | 96/16798 | 6/1996 |
| WO | WO00/71608 | 11/2000 |
| WO | WO00/71609 | 11/2000 |
| WO | 2004/087420 | 10/2004 |
| WO | 2004/094141 | 11/2004 |
| WO | WO2005/026275 | 3/2005 |
| WO | WO2005/085331 | 9/2005 |

OTHER PUBLICATIONS

Wolf et al., "*Modifying Surface Features—Extrusion Coating and Lamination*", 2007 Place Conference, Sep. 17-19, 2007, St. Louis, pp. 1-24.

* cited by examiner

*Primary Examiner* — Michael Wieczorek

(57) ABSTRACT

Methods for producing a coated biaxially oriented film and films made therefrom. An illustrative method can include orienting a base film in a first direction to provide an uniaxially oriented film; coating at least a portion of the uniaxially oriented film with a polyolefin dispersion to produce a coated uniaxially oriented film; and orienting the coated uniaxially oriented film in a second direction at a temperature sufficient to stretch and anneal the coated film to provide a coated biaxially oriented film having greater than 80% gloss.

40 Claims, No Drawings

COATED BIAXIALLY ORIENTED FILM VIA IN-LINE COATING PROCESS

FIELD OF THE INVENTION

The present invention generally relates to oriented films for consumer packaging. More particularly, embodiments of the present invention relate to coated, biaxially oriented polypropylene films and methods for producing same.

BACKGROUND OF THE INVENTION

Films suitable for consumer products, such as bags and packages, are commonly produced from oriented polypropylene (OPP) films. Such films for consumer packaging applications are typically multi-layered having a core layer and one or more coating layers disposed thereon to improve blocking and slip characteristics of the film.

The blocking and slip characteristics of the film are very important, especially when the film is processed on high-speed packaging equipment. A film that exhibits good blocking and slip characteristics typically provides good processability on high-speed packaging equipment. The sealing characteristics of the film is also very important. In hot seal packaging applications, the seal can be formed by heat and pressure. In cold seal operations, the seal can be formed by first applying an "adhesive" to the film area to be sealed followed by pressure.

Uncoated thermoplastic films, including OPP films, have poor sealing characteristics. In an effort to address these problems, coatings that provide improved heat-sealing characteristics are being developed. However, there is a tradeoff because coatings that can improve seal characteristics often adversely affect blocking and slip characteristics.

For example, U.S. Pat. No. 5,419,960 discloses low temperature seal coating compositions comprising a copolymer of about 65 to 95 wt % ethylene and about 5 to 35 wt % of acrylic or methacrylic acid, based on the weight of the polymer, in which about 2 to 80% of the carboxylate groups are neutralized with metal ions from Group IA, IIA or IIB of the Periodic Table, preferably sodium ions.

WO 2005/026275 discloses a coating composition that includes an aqueous dispersion of a substantially non-polar copolymer of ethylene and an alpha-olefin having less than 20 carbon atoms, and an additive selected from the group consisting of an anti-blocking and slip agent, a coalescent and wetting agent, and mixtures thereof.

U.S. 2005/0100754 discloses aqueous dispersions comprising at least one thermoplastic resin, at least one dispersing agent, and water, wherein the dispersion has a pH of less than 12, including aqueous dispersions having a volume average particle size of less than about 5 microns (5000 nanometers). The dispersing agents can include ethylene-carboxylic acid polymers, and their salts, such as ethylene-acrylic acid copolymers or ethylene-methacrylic acid copolymers, and others.

WO 2005/085331 discloses aqueous dispersions comprising at least one thermoplastic resin, at least one dispersing agent, and water, wherein the dispersion has a pH of less than 12, including aqueous dispersions having a volume average particle size of less than about 5 microns (5000 nanometers). The thermoplastic resins include alpha-olefin interpolymers of ethylene with at least one comonomer selected from the group consisting of $C_4$-$C_{20}$ linear, branched or cyclic dienes, or an ethylene-vinyl compound, among others. The dispersing agents include ethylene-carboxylic acid polymers, and their salts, such as ethylene-acrylic acid copolymers or ethylene-methacrylic acid copolymers, and others.

In addition to the coating itself, the technique used to apply the coating to the film can have a drastic effect on the overall film characteristics. Coatings have been typically applied to films using in-line or off-line techniques. In-line coating is done during the film forming process, typically before or after a stretching operation, and before heat-setting the film. Conversely, off-line coating is done after the film has been formed and after the heat-setting stage and is usually not performed during film the manufacturing step, but rather as a separate step. Moreover, off-line coating processes tend to provide films having lower adhesion than in-line coated films. As a result, a primer is typically used for off-line coating processes to improve adhesion. Consequently, off-line coating is less cost effective.

In the case of polyolefin dispersion coatings, the resulting film often exhibits less than desirable haze. For example, WO 2005/026275 discloses off-line coating its polyolefin dispersions to films. However, the resulting films show a higher than desired haze level. The high haze is believed to be due to the particle sizes of the polyolefin in the water based dispersion being too large. In fact, during the manufacturing process on making the dispersion, it is very difficult to keep the polyolefins dispersed in very small particle sizes.

Furthermore, off-line coating applications may use organic solvents and cosolvent, which are not suitable for in-line coating. Organic solvents typically cause sticking or blocking of the film during the winding operations used during film manufacture and may be harmful, hazardous in use, or toxic and detrimental to the environment. Besides the problems of disposal of such hazardous, or toxic materials, films made in this way often contain a residual amount of the solvent, and so may not be suitable for use in applications where they come into contact with food products. U.S. Pat. Nos. 6,939,584; 5,525,421; 4,956,241; and 4,956,233 discuss in-line or off-line coating techniques.

There is a need, therefore, for cost effective methods for making films, the films made therefrom that exhibit excellent block, slip and sealing characteristics.

SUMMARY OF THE INVENTION

Coated, biaxially oriented films and methods for producing the same are provided. In one or more embodiments, a sequential orientation with in-line coating method is described. In at least one specific embodiment, the method can include orienting a base film in a first direction to provide an uniaxially oriented film; coating at least a portion of the uniaxially oriented film with a polyolefin dispersion (POD) to produce a coated uniaxially oriented film; and orienting the coated uniaxially oriented film in a second direction at a temperature sufficient to stretch and anneal the coated film to provide a coated biaxially oriented film having greater than 80% gloss.

In at least one other specific embodiment, the method can include orienting a base film comprising at least one skin layer on a first side of a core layer and at least one skin layer on a second side of the core layer, the base film oriented in a first direction at a first temperature to provide a uniaxially oriented film; coating at least a portion of the uniaxially oriented film with a polyolefin dispersion to produce a coated uniaxially oriented film, wherein the polyolefin dispersion is directly coated on at least a portion of the oriented film; and orienting the coated uniaxially oriented film in a second direction at a second temperature sufficient to stretch and anneal the coated film to provide a coated biaxially oriented film having greater than 80% gloss, wherein the second temperature is greater than the first temperature and greater than the melting temperature of the polyolefin in the polyolefin dispersion In at least one specific embodiment, the coated biaxially oriented film can include one or more core layers; at least one skin layer disposed on a first surface of the one or more core layers; at least one skin layer disposed on a second surface of the one or more core layers, wherein the skin layers and core layers are co-extruded; and a coating comprising one or more polyolefin dispersions deposited directly adjacent an outermost skin layer disposed on the first side of the one or more core layers. Prior to deposition of the coating, the co-extruded film is oriented in a first direction and after deposition of the coating, the oriented film is oriented in a second direction without taken off line.

DETAILED DESCRIPTION OF THE INVENTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

In one or more embodiments, one or more thermoplastics can be extruded to provide a base film. The base film can be oriented in the machine direction to provide a machine oriented film. The resulting machine oriented film can be coated with one or more polyolefin dispersions. Preferably, the polyolefin dispersion is directly coated on at least a portion of the oriented film, i.e. in-line coated. The coated film can then be oriented or stretched in a transverse direction at a temperature sufficient to stretch and anneal the coated film to provide a multi-layer film having less than 5% haze and greater than 80% gloss.

In one or more embodiments, the polyolefin dispersions can be applied to the base film or substrate using conventional techniques including, but not limited to, gravure coating, brush coating, dipping, curtain flow coating, roll coating, or spraying. In the case of single layer substrates, such as a thermoplastic film, the polyolefin dispersions can be applied to at least one surface of the single layer substrate. In the case of multi-layer coextruded film, the polyolefin dispersion can be applied to a coextruded layer, i.e. base film or substrate, of the multilayer film. Preferably, the polyolefin dispersion is directly applied, i.e. in-line coated, to the single layer or multilayer films after being oriented by stretching in at least one direction. A gravure coating process is the preferred method of applying coatings because it can apply a thin even coating on films. As used herein, the term "in-line" refers to an in-situ process or process step whereby the film to be coated is not taken or otherwise removed from the film manufacturing line between the first film orientation step and the second film orientation step.

In operation, one or more thermoplastics are extruded or co-extruded to provide a base film or substrate. The base film or substrate can have a thickness of about 5 to about 200 mils, preferably 20-100, more preferably 30-70, and more preferably 30-40 mils. The extruded film can be cooled to about room temperature to provide a solid or substantially solid film. A water quench can be used to accelerate the cooling rate. The cooled film can then be rolled and re-heated. The re-heated film can be oriented or stretched in the machine direction (MD). Preferably, the film is oriented or stretched in the machine direction at temperature ranging from about 100° C. to about 200° C., more preferably about 120° C. to about 140° C. The machine direction oriented film (MDO) can then be quenched or otherwise cooled to a temperature of about 80 to 160° C., preferably about 100 to about 140° C.

The MDO film can be at least partially coated with the one or more polyolefin dispersions. Preferably, the polyolefin dispersion(s) is directly coated, i.e. in-line coated, onto the MDO film. The at least partially coated MDO film is then oriented or stretched in the transverse direction (TD). Such stretching can incur at a temperature sufficient to stretch and anneal or otherwise cure the coated film to provide a multi-layer film having less than 5% haze and greater than 80% gloss. In one or more embodiments, the temperature is about 130° C. to about 170° C., more preferably about 140° C. to about 155° C., more preferably about 140° C. to about 150° C., more preferably about 145° C. to about 150° C. The haze is preferably less than 5%, less than 4%, less than 3%, less than 2%, or less than 1%. The gloss is preferably greater than 80%, 85%, 90%, 95%, or greater than 98%.

The polyolefin dispersion can be applied to the film or substrate at a coating weight of 0.5 to 5.0 grams/m$^2$, or 1.0 to 3.0 grams/m$^2$, or 2.0 to 2.5 grams/m$^2$ of substrate.

Preferred orientation ratios can be about three to about six times the extruded width or length in the machine direction and between about four to about ten times the extruded width in the transverse direction.

Thermoplastic

In one or more embodiments, the thermoplastic is or includes one or more propylene homopolymers, ethylene homopolymers, high density polyethylene (HDPE), medium density polyethylenes (MDPE), low density polyethylene (LDPE), linear low density polyethylene (LLDPE), very low density polyethylene (VLDPE), isotactic polypropylene, syndiotactic polypropylene, EPB terpolymers, EP copolymers, propylene-butylene copolymers, amorphous polyamides, EVOH copolymers, derivatives thereof, and blends thereof.

As used herein, "isotactic" refers to polymeric stereoregularity having at least 40% isotactic pentads of methyl groups derived from propylene according to analysis by $^{13}$C-NMR.

As used herein, the term "minimum seal temperature" refers to the temperature reached when one temperature yields a seal value of less than a specified grams/cm peel force and the next temperature yields a seal value of greater than or equal to the specified grams/cm peel force.

Polyolefin Dispersion

In one or more embodiments, the polyolefin dispersion can be an aqueous dispersion. As used herein, the term "aqueous dispersion" refers to a dispersion in which the continuous phase can include liquid water. The term "dispersion" as used herein refers to a mixture of at least two components, with the mixture having a continuous phase and a dispersed phase. Dispersions can be formed, for example, of: (1) an emulsion of two or more essentially liquid materials with or without one or more dispersing agents, or (2) dispersions of solid particles with or without one or more dispersing agents.

In one or more embodiments, the polyolefin dispersion can include a first polymer and a second polymer dispersed in a liquid phase. The second polymer can include at least 5 wt % of the total combined weight of the first copolymer and the second polymer. In one or more embodiments, the polyolefin dispersion can include a first polymer dispersed in a first liquid, and a second polymer dispersed in a second liquid. The liquid can be any liquid suitable for dispersing the first polymer and/or the second polymer. Preferably, the liquid can be water. As used herein, the term "polymer" refers to homopolymers, copolymers, interpolymers, terpolymers, etc. Likewise, a "copolymer" refers to a polymer having two or more monomers as well as to a polymer having three or more monomers.

The first polymer can be any suitable polymer having a mean size less than or equal to 5000 nanometers. The mean particle size of the first polymer can be less than or equal to 4000 nanometers, or less than or equal to 3000 nanometers, or less than or equal to 2000 nanometers, or less than or equal to 1500 nanometers. Preferably, the mean particle size of the first polymer can be less than or equal to 1200 nanometers. Preferably, the first polymer can be a copolymer.

The second polymer can be any suitable polymer having a mean size less than or equal to 50 nanometers. The mean particle size of the second polymer can be less than 45 nanometers, or less than 40 nanometers, or less than 35 nanometers, or less than 30 nanometers. Preferably, the second polymer can be a copolymer.

In one or more embodiments, the liquid can be or includes water and the first polymer and the second polymer are dispersed with at least one dispersing agent to form at least one aqueous dispersion.

In another embodiment, the first polymer of the polyolefin dispersion can be dispersed in a first aqueous dispersion and the second copolymer can be dispersed in a second aqueous dispersion.

In another embodiment, the mean particle size of the first aqueous dispersion of the polyolefin dispersions can be less than or equal to 1000 nanometers, or less than or equal to 800 nanometers, or less than or equal to 600 nanometers, or less than or equal to 400 nanometers.

Preferably, the first copolymer can include ethylene and an alpha-olefin having less than 20 carbon atoms. More preferably, the first copolymer can include ethylene and the alpha-olefin can be 1-octene.

Preferably, the melt index of the first copolymer can be less than or equal to 35 grams/10 min, or less than or equal to 25 grams/10 min, or less than or equal to 15 grams/10 min, or less than or equal to 10 grams/10 min (dgrams) measured in accordance with the test methods described herein.

The first polymer of the first aqueous dispersion of the polyolefin dispersions can include a first ethylene copolymer and a second ethylene copolymer. In this embodiment, the first ethylene copolymer has a first mean particle size and can include ethylene and a first alpha-olefin. The second ethylene copolymer has a second mean particle size and can include ethylene and a second alpha-olefin. The first alpha-olefin and the second alpha-olefin have less than 20 carbon atoms. In one or more embodiments, the first alpha-olefin and the second alpha-olefin are the same. Preferably, the first alpha-olefin and the second alpha-olefin are 1-octene. In this embodiment, the mean particle size of the first ethylene copolymer can be less than 1100 nanometers and the mean particle size of the second ethylene copolymer can be less than 700 nanometers. The melt index of the first ethylene copolymer and the second copolymer can be less than 10 grams/10 min (dgrams) measured in accordance with the test methods described herein.

In another embodiment, the first aqueous dispersion can be a mixture of the first ethylene copolymer and the second ethylene copolymer. The mean particle size of the mixture can be in the range from 400 to 1200 nanometers, or from 400 to 1000 nanometers, or from 400 to 800 nanometers, or from 400 to 700 nanometers, or from 400 to 600 nanometers.

In another embodiment, the first ethylene copolymer can include ethylene and 1-octene, has a mean particle size of less than 1100 nanometers and a melt index of less than 10 grams/ 10 min measured in accordance with the test methods described herein. The second ethylene copolymer can include ethylene and 1-octene, has a mean particle size of less than 850 nanometers and a melt index of less than 35 grams/10 min measured in accordance with the test methods described herein.

In one or more embodiments, the first alpha-olefin and the second alpha-olefin are different.

In one or more embodiments, the dispersing agent of the polyolefin dispersion can include a copolymer selected from the group consisting of an ethylene-acrylic acid copolymer, an ionized salt of the ethylene-acrylic acid copolymer, an ethylene-methacrylic acid copolymer, an ionized salt of the ethylene-methacrylic acid copolymer, a fatty acid, a ionized salt of a fatty acid, and mixtures thereof.

In a preferred embodiment, the dispersing agent can be ethylene-acrylic acid copolymer ionized with potassium hydroxide or montanic acid ionized with potassium hydroxide.

In another embodiment, the second copolymer can be selected from the group consisting of an ethylene-acrylic acid copolymer, an ionized salt of the ethylene-acrylic acid copolymer, an ethylene-methacrylic acid copolymer, an ionized salt of the ethylene-methacrylic acid copolymer, and mixtures thereof.

The mean particle size of the second aqueous dispersion can be less than 50 nanometers, or less than 40 nanometers, or less than 30 nanometers, or less than 20 nanometers.

In one or more embodiments, the second polymer can include at least 10 wt % of the total combined weight of the first polymer and the second polymer, or at least 15 wt % of the total combined weight of the first polymer and the second polymer.

In one or more embodiments, the second copolymer can include at least 10 wt % of the total combined weight of the first copolymer and the second copolymer, or at least 15 wt % of the total combined weight of the first copolymer and the second copolymer.

In one or more embodiments, the polyolefin dispersions further can include a slip agent. The slip agent has a mean particle size of less than 130 nanometers, or less than 100 nanometers, or less than 70 nanometers, or less than 50 nanometers. The slip agent can include a polyethylene wax, a paraffin wax, a microcrystalline wax, a beeswax, a camauba wax, a montan wax, a candelilla wax, a synthetic wax, or mixtures thereof.

In one or more embodiments, the polyolefin dispersions can include one or more anti-block agents. The anti-block agents can be selected from the group consisting of a polymethylmethacrylate particles, silicone particles, colloidal silica, fumed silica particles, silicone gum, talc, finely-divided clay and mixtures thereof. The mean particle size of the anti-block agent can be from 0.5 to 10 microns.

In one or more embodiments, the polyolefin dispersions can include one or more coalescent and wetting agents. The coalescent and wetting agents can be selected from the group consisting of selected from the group consisting of a hexyl or benzyl ether of ethylene glycol, a hexyl ether of diethylene glycol, a butyl alcohol, a hexyl alcohol, an octyl alcohol, diacetone alcohol, a non-ionic surfactant, an anionic surfactant and mixtures thereof.

In one or more embodiments, the polyolefin dispersions can include one or more primers. The primer can be selected from the group consisting of can be selected from the group consisting of polyethylene imine (PEI) resin, a crosslinked epoxy resin, and a polyurethane resin.

Base Film

The base film (i.e. "substrate") can be selected from the group consisting of a polyolefin film, a polypropylene film, a polyethylene terephthalate film, a cellophane film, a polyethylene film, paper, aluminum foil, a single-layer thermoplastic film, and a polyamide film. The substrates can also be any surface of a layer of the multi-layer thermoplastic films described herein.

The base film can include a core layer, one or more tie layers (i.e., a first tie layer and/or a second tie layer), one or more skin layers (i.e., a skin layer and/or a second skin layer), and can include one or more additives. Such multi-layer films can be oriented in one or more directions, and can be subjected to one or more surface treatments and/or metallization treatments. One or both surfaces of such multi-layer film can receive a top coating. These multi-layer films can be used as mono-webs or used in laminations.

The core layer can be most the thickest layer and provide the foundation of the multi-layer structure. For example, the core layer can have a thickness ranging from about 5 to 100 microns, more preferably from about 5 to 50 microns, most preferably from 5 to 25 microns.

The core layer can be any film-forming polyolefin known in the art. For example, the core layer can include at least one polymer selected from the group consisting of butylene polymer, ethylene polymer, high density polyethylene (HDPE) polymer, medium density polyethylene (MDPE) polymer, low density polyethylene (LDPE) polymer, propylene (PP) polymer, isotactic polypropylene (iPP) polymer, high crystallinity polypropylene (HCPP) polymer, ethylene-propylene (EP) copolymers, ethylene-propylene-butylene (EPB) terpolymers, propylene-butylene (PB) copolymers, an ethylene elastomer, ethylene-based plastomer, propylene elastomer and combinations or blends thereof. As used herein, the term "elastomer" refers to an ethylene-based or propylene-based copolymer that can be extended or stretched with force to at least 100% of its original length (i.e., twice its original length), and upon removal of the force, rapidly (e.g., within 5 seconds) returns to its approximate original dimensions.

As used herein, an "ethylene-based plastomer" refers to an ethylene-based copolymer having a density in the range of 0.850 to 0.920 grams/cm$^3$, preferably in the range 0.86 to 0.90 grams/cm$^3$, and a Differential Scanning Calorimetry (DSC) melting point of greater than or equal to 40° C.

As used herein, the term "propylene-based plastomer" refers to homopolymers, copolymers, or polymer blends having at least one of the following sets of properties:

(a) density in the range of 0.850 to 0.920 grams/cm$^3$, a DSC melting point in the range of 40 to 160° C., and a MFR in the range of 2 to 100 dg/min;

(b) a propylene-ethylene copolymer including from about 75 wt % to about 96 wt % propylene, from about 4 to 25 wt % ethylene and having a density in the range of 0.850 to 0.900 grams/cm$^3$;

(c) a flexural modulus of not more than 2100 MPa and an elongation of at least 300%;

(d) isotactic stereoregularity, from about 84 to 93 wt % propylene, from about 7 to 16 wt % ethylene, a DSC melting point in the range of from about 42 to 85° C., a heat of fusion less than 75 J/g, crystallinity from about 2% to 65%, and a molecular weight distribution from about 2.0 to 3.2;

(e) a polymer blend, comprising at least one polymer (A) and at least one polymer (B), polymer (A) comprising from about 60 to 98 wt % of the blend, and polymer (A) comprising from about 82 to 93 wt % of units derived from propylene and from about 7 to 18 wt % of units derived from a comonomer selected from the group consisting of ethylene and an unsaturated monomer other than ethylene, and polymer (A) can be further characterized as comprising crystallizable propylene sequences, and polymer (B) comprising an isotactic thermoplastic polymer other than polymer (A); and (f) a polymer blend, comprising at least one polymer (A) and at least one polymer (B), polymer (A) comprising from about 60 to 98 wt % of the blend, and polymer (A) comprising from about 65 to 96 wt % of units derived from propylene and from about 4 to 35 wt % of units derived from a comonomer selected from the group consisting of ethylene and an unsaturated monomer other than ethylene, and polymer (A) can be further characterized as comprising crystallizable propylene sequences, and polymer (B) comprising an isotactic thermoplastic polymer other than polymer (A).

As used herein, the term "stereoregular" refers to a predominant number, e.g., greater than 80%, of the propylene residues in the polypropylene or in the polypropylene continuous phase of a blend, such as impact copolymer exclusive of any other monomer such as ethylene, has the same 1,2 insertion and the stereochemical orientation of the pendant methyl group can be the same, either meso or racemic.

Preferably, the propylene-based plastomer can be or include ethylene-propylene (EP) random copolymers, ethylene-propylene-butylene (EPB) random terpolymers, heterophasic random copolymers, butylene polymers, metallocene polypropylenes, propylene-based or ethylene-based elastomers and/or ethylene-based plastomers, or combinations thereof. In preferred embodiments, the propylene-based plastomer has a density in the range of 0.850 to 0.920 grams/cm$^3$, a DSC melting point in the range of 40 to 160° C., and a MFR in the range of 2 to 100 dgrams/min More preferably, the propylene-based plastomer can be a grade of VISTAMAXX™ polymer (commercially available from ExxonMobil Chemical Company of Baytown, Tex.). Preferred grades of VISTAMAXX™ are VM6100 and VM3000. Alternatively, the propylene-based plastomer can be a suitable grade of VERSIFY™ polymer (commercially available from The Dow Chemical Company of Midland, Mich.), Basell CATALLOY™ resins such as ADFLEX™ T100F, SOFTELL™ Q020F, CLYRELL™ SM1340 (commercially available from Basell Polyolefins of The Netherlands), PB (propylene-butene-1) random copolymers such as Basell PB 8340 (commercially available from Basell Polyolefins of The Netherlands), Borealis BORSOFT™ SD233CF, (commercially available from Borealis of Denmark), EXCEED™ 1012CA and 1018CA metallocene polyethylenes, EXACT™ 5361, 4049, 5371, 8201, 4150, 3132 ethylene-based plastomers, EMCC 3022.32 low density polyethylene (LDPE) (commercially available from ExxonMobil Chemical Company of Baytown, Tex.), Total Polypropylene 3371 polypropylene homopolymer (commercially available from Total Petrochemicals of Houston, Tex.) and JPP 7500 C2C3C4 terpolymer (commercially available from Japan Polypropylene Corporation of Japan).

In one or more embodiments, the propylene-based plastomer can be a propylene-ethylene copolymer and the first tie layer can include at least 10 wt % of the propylene-based plastomer in the first tie layer, preferably at least 25 wt % of the propylene-based plastomer in the first tie layer, more preferably at least 50 wt % of the propylene-based plastomer in the first tie layer, and most preferably at least 90 wt % of the propylene-based plastomer in the first tie layer. In some preferred embodiments, the first tie layer can include about 100 wt % of the propylene-based plastomer.

In one or more embodiments, the propylene-based plastomer has a propylene content ranging from 75 to 96 wt %, preferably ranging from 80 to 95 wt %, more preferably ranging from 84 to 94 wt %, most preferably ranging from 85 to 92 wt %, and an ethylene content ranging from 4 to 25 wt %, preferably ranging from 5 to 20 wt %, more preferably ranging from 6 to 16 wt %, most preferably ranging from 8 to 15 wt %.

The propylene-based plastomer can have a density ranging from 0.850 to 0.920 grams/cm$^3$, more preferably ranging from 0.850 to 0.900 grams/cm$^3$, most preferably from 0.870 to 0.885 grams/cm$^3$.

The DSC melting point of the propylene-based plastomer can range from 40° C. to 160° C., more preferably from 60° C. to 120° C. Most preferably, the DSC melting point can be below 100° C.

In one or more embodiments, the propylene-based plastomer has a MFR ranging from 2 to 100 dgrams/min, preferably ranging from 5 to 50 dgrams/min, more preferably ranging from 5 to 25 dgrams/min, most preferably from 5 to 10 dgrams/min.

The propylene-based plastomer can have a molecular weight distribution (MWD) below 7.0, preferably ranging from 1.8 to 5.0, more preferably ranging from 2.0 to 3.2, most preferably, less than or equal to 3.2.

The propylene-based plastomer can have a flexural modulus of preferably not more than 2100 MPa, more preferably not more than 1500 MPa, most preferably ranging from 20 MPa to 700 MPa.

The elongation of the propylene-based plastomer can be at least 300%, more preferably at least 400%, even more preferably at least 500%, and most preferably greater than 1000%. In some cases, elongations of 2000% or more are possible.

The heat of fusion of the propylene-based plastomer can be less than 75 J/g, less than 60 J/g, less than 55 J/g, less than 50 J/g, or less than 45 J/g.

In one or more embodiments, the propylene-based plastomer can have isotactic stereoregular crystallinity. In other embodiments, the propylene-based plastomer has a crystallinity ranging from 2% to 65%.

The propylene-based plastomer can be produced via a single site catalyst polymerization process. In one or more embodiments, the single site catalyst incorporates hafnium.

The core layer can include one or more additional polymers. When one or more additional polymers are present, the propylene-based plastomer can be present in an amount of from at least about 25 wt % to about 75 wt % of the core layer. Amounts of the propylene-based plastomer of less than 25 wt % (e.g., 10 wt %) or greater than 75 wt % (e.g., 90 wt % or more) are also permissible, depending upon the desired properties for the multi-layer film product. The optional additional polymers can include one or more C2-C8 homopolymers, copolymers, or terpolymers.

In a preferred embodiment, the core layer can be an iPP homopolymer. An example of a suitable iPP can be ExxonMobil PP4712E1 (commercially available from ExxonMobil Chemical Company of Baytown, Tex.). Another suitable iPP can be Total Polypropylene 3371 (commercially available from Total Petrochemicals of Houston, Tex.). An example of HCPP can be Total Polypropylene 3270 (commercially available from Total Petrochemicals of Houston, Tex.).

The core layer can include one or more hydrocarbon resins. Hydrocarbon resins can serve to enhance or modify the flexural modulus, improve processability, or improve the barrier properties of the film. The resin can be a low molecular weight hydrocarbon that can be compatible with the core polymer. Optionally, the resin can be hydrogenated. The resin can have a number average molecular weight less than 5000, preferably less than 2000, most preferably in the range of from 500 to 1000. The resin can be natural or synthetic and can have a softening point in the range of from 60 to 180° C.

Suitable hydrocarbon resins include, but are not limited to petroleum resins, terpene resins, styrene resins, and cyclopentadiene resins. In one or more embodiments, the hydrocarbon resin can be selected from the group consisting of aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof.

Hydrocarbon resins that can be suitable for use as described herein include EMPR 120, 104, 111, 106, 112, 115, EMFR 100 and 100A, ECR-373 and ESCOREZ® 2101, 2203, 2520, 5380, 5600, 5618, 5690 (commercially available from ExxonMobil Chemical Company of Baytown, Tex.); ARKON™ M90, M100, M115 and M135 and SUPER ESTER™ rosin esters (commercially available from Arakawa Chemical Company of Japan); SYLVARES™ phenol modified styrene, methyl styrene resins, styrenated terpene resins, ZONATAC™ terpene-aromatic resins, and terpene phenolic resins (commercially available from Arizona Chemical Company of Jacksonville, Fla.); SYLVATAC™ and SYLVALITE™ rosin esters (commercially available from Arizona Chemical Company of Jacksonville, Fla.); NORSOLENE™ aliphatic aromatic resins (commercially available from Cray Valley of France); DERTOPHENE™ terpene phenolic resins (commercially available from DRT Chemical Company of Landes, France); EASTOTAC™ resins, PICCOTAC™ $C_5/C_9$ resins, REGALITE™ and REGALREZ™ aromatic and REGALITE™ cycloaliphatic/aromatic resins (commercially available from Eastman Chemical Company of Kingsport, Tenn.); WINGTACK™ ET and EXTRA™ (commercially available from Sartomer of Exton, Pa.); FORAL™, PENTALYN™, and PERMALYN™ rosins and rosin esters (commercially available from Hercules, now Eastman Chemical Company of Kingsport, Tenn.; QUINTONE™ acid modified $C_5$ resins, $C_5/C_9$ resins, and acid modified $C_5/C_9$ resins (commercially available from Nippon Zeon of Japan); and LX™ mixed aromatic/cycloaliphatic resins (commercially available from Neville Chemical Company of Pittsburgh, Pa.); CLEARON™ hydrogenated terpene aromatic resins (commercially available from Yasuhara of Japan); and PICCOLYTE™ (commercially available from Loos & Dilworth, Inc. of Bristol, Pa.). Other suitable hydrocarbon resins can be found in U.S. Pat. No. 5,667,902, incorporated herein by reference. The preceding examples are illustrative only and by no means limiting.

Preferred hydrocarbon resins for use in the films described include saturated alicyclic resins. Such resins, if used, can have a softening point in the range of from 85 to 140° C., or preferably in the range of 100 to 140° C., as measured by the ring and ball technique. Examples of suitable, commercially available saturated alicyclic resins are ARKON-P® (commercially available from Arakawa Forest Chemical Industries, Ltd., of Japan).

The amount of such hydrocarbon resins, either alone or in combination, in the core layer can be preferably less than 20 wt %, more preferably in the range of from 1 to 5 wt %, based on the total weight of the core layer.

The core layer can include one or more additives such as opacifying agents, pigments, colorants, cavitating agents, slip agents, antioxidants, anti-fog agents, anti-static agents, fillers, moisture barrier additives, gas barrier additives, and combinations thereof, as discussed in further detail below. A suitable anti-static agent can be ARMOSTAT™ 475 (commercially available from Akzo Nobel of Chicago, Ill.).

Cavitating agents can be present in the core layer in an amount less than 30 wt %, preferably less than 20 wt %, most preferably in the range of from 2 to 10 wt %, based on the total weight of the core layer. Alternatively, the core layer can be cavitated by beta nucleation.

To prevent blocking, the base film can contain one or more anti-block particles in the skin layer to be coated. One or more anti-block or slip additives can be added into the other uncoated base film to help reduce blocking in a roll form. The uncoated side can also be deposited with a layer of metal, such as aluminum, to provide a good barrier property which is desired for food packaging applications. (The uncoated side can also be coated with another coating such as PVdC or acrylics to add functionality.)

Preferably, the total amount of additives in the core layer can include up to about 20 wt % of the core layer, but some embodiments can include additives in the core layer in an amount up to about 30 wt % of the core layer.

Tie Layers

In one or more embodiments, the multi-layer film can include one or more tie-layers. A tie layer can be used to connect two other, partially or fully incompatible, layers of the multi-layer film structure, e.g., a core layer and a skin layer, and can be positioned intermediate these other layers. As used herein, the term "intermediate" refers to the position of one layer of a multi-layer film wherein said layer lies between two other identified layers. In one or more embodiments, the intermediate layer can be in direct contact with either or both of the two identified layers. In one or more embodiments, one or more additional layers can also be disposed between the intermediate layer and either or both of the two identified layers.

In one or more embodiments, a first tie layer can be in direct contact with the surface of the core layer. In other embodiments, a second tie layer or additional tie layers can be intermediate the core layer and the first tie layer.

In one or more embodiments, the film described herein can be a 4-layer metallized multi-layer film, including a core layer, a skin layer, and a metallized layer, all as described herein, and a tie layer located either (a) intermediate the core layer and the skin layer or (b) intermediate the core layer and the metallized layer. In other embodiments, the multi-layer film described herein can be a 5-layer metallized multi-layer film, including a core layer, a skin layer, a metallized layer, a first tie layer located intermediate the core layer and the seal layer and a second tie layer located intermediate the core layer and the metallized layer. The tie layers of the present invention preferably can include at least one polymer selected from the group consisting of butylene polymer, ethylene polymer, high density polyethylene (HDPE) polymer, medium density polyethylene (MDPE) polymer, low density polyethylene (LDPE) polymer, propylene (PP) polymer, isotactic polypropylene (iPP) polymer, high crystallinity polypropylene (HCPP) polymer, ethylene-propylene (EP) copolymers, ethylene-propylene-butylene (EPB) terpolymers, propylene-butylene (PB) copolymer, an ethylene elastomer, a ethylene-based plastomer, a propylene elastomer and combinations or blends thereof.

In one or more embodiments, the tie layers can include one or more propylene-based plastomer, as defined herein, and, optionally, one or more other polymers. Preferably, the propylene-based plastomer includes ethylene-propylene (EP) random copolymers, ethylene-propylene-butylene (EPB) random terpolymers, heterophasic random copolymers, butylene polymers, metallocene polypropylenes, propylene-based or ethylene-based elastomers and/or ethylene-based plastomers, or combinations thereof.

The tie layers can include one or more additional polymers. When one or more additional polymers are present, the propylene-based plastomer can be preferably present in an amount of from at least about 25 to about 75 wt % of the tie layer. Amounts of the propylene-based plastomer of less than 25 wt % (e.g., 10 wt %) or greater than 75 wt % (e.g., 90 wt % or more) are also permissible, depending upon the desired properties for the multi-layer film product. The optional additional polymers can include one or more $C_2$-$C_8$ homopolymers, copolymers, or terpolymers. Preferably, the additional polymer can be at least one of an iPP homopolymer, an EP copolymer, and combinations thereof. An example of a suitable iPP homopolymer can be Total Polypropylene 3371 (commercially available from Total Petrochemicals of Houston, Tex.).

In one or more embodiments, the tie layer can include one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

The thickness of the tie layer can range from about 0.50 to 25 microns, preferably from about 0.50 to 12 microns, more preferably from about 0.50 to 6 microns, and most preferably from about 2.5 to 5 microns. However, in some thinner films, the tie layer thickness can range from about 0.5 to 4 microns, or from about 0.5 to 2 microns, or from about 0.5 to 1.5 microns.

Skin Layers

In one or more embodiments, the skin layer includes one or more polymers that suitable for heat-sealing or bonding to itself when crimped between heated crimp-sealer jaws. Suitable polymers include copolymers or terpolymers of ethylene, propylene, and butylene and can have DSC melting points either lower than or greater than the DSC melting point of the propylene-based plastomer. In some preferred embodiments, the skin layer can include at least one polymer selected from the group consisting of propylene homopolymer, ethylene-propylene copolymer, butylene homopolymer and copolymer, ethylene-propylene-butylene (EPB) terpolymer, ethylene vinyl acetate (EVA), metallocene-catalyzed propylene homopolymer, and combinations thereof. An example of a suitable EPB terpolymer can be Chisso 7794 (commercially available from Chisso Corporation of Japan).

Heat sealable blends can be utilized in providing the skin layer. Thus, along with the skin layer polymer identified above there can be, for example, other polymers, such as polypropylene homopolymer, e.g., one that can be the same as, or different from, the iPP of the core layer. The skin layer can additionally or alternatively include materials selected from the group consisting of ethylene-propylene random copolymers, LDPE, linear low density polyethylene (LLDPE), medium density polyethylene (MDPE), and combinations thereof.

In a preferred embodiment, the skin layer can be a substrate for any of the polyolefin dispersions described.

The skin layer can include processing aid additives, such as anti-block agents, anti-static agents, slip agents and combinations thereof, as discussed in further detail below.

The thickness of the skin layer can be range from about 0.10 to 7.0 microns, preferably about 0.10 to 4 microns, and most preferably about 0.10 to 3 microns. In one or more embodiments, the skin layer thickness can be from about 0.10 to 2 microns, 0.10 to 1 microns, or 0.10 to 0.50 microns. The skin layer can have a thickness ranging from about 0.5 to about 2 microns, about 0.5 to about 3 microns, or about 1 to about 3.5 microns.

Additives

In one or more embodiments, one or more additives can be present in any one or more layers of the multi-layer film. Suitable additives can include, but are not limited to opacifying agents, pigments, colorants, cavitating agents, slip agents, antioxidants, anti-fog agents, anti-static agents, anti-block agents, fillers, moisture barrier additives, gas barrier additives and combinations thereof. Such additives can be used in effective amounts, which vary depending upon the property required.

Examples of suitable opacifying agents, pigments or colorants are iron oxide, carbon black, aluminum, titanium dioxide ($TiO_2$), calcium carbonate ($CaCO_3$), polybutylene terephthalate (PBT), talc, beta nucleating agents, and combinations thereof.

Cavitating or void-initiating additives can include any suitable organic or inorganic material that can be incompatible with the polymer material(s) of the layer(s) to which it can be added, at the temperature of biaxial orientation, in order to create an opaque film. Examples of suitable void-initiating particles are PBT, nylon, solid or hollow preformed glass spheres, metal beads or spheres, ceramic spheres, calcium carbonate, talc, chalk, or combinations thereof. Cavitation can also be introduced by beta-cavitation, which includes creating beta-form crystals of polypropylene and converting at least some of the beta-crystals to alpha-form polypropylene crystals and creating a small void remaining after the conversion. Preferred beta-cavitated embodiments of the core layer can include a beta-crystalline nucleating agent. Substantially any beta-crystalline nucleating agent ("beta nucleating agent" or "beta nucleator") can be used. The average diameter of the void-initiating particles typically can be from about 0.1 to 10 microns.

Slip agents can include higher aliphatic acid amides, higher aliphatic acid esters, waxes, silicone oils, and metal soaps. Such slip agents can be used in amounts ranging from 0.1 to 2 wt % based on the total weight of the layer to which it can be added. An example of a slip additive that can be useful for this invention can be erucamide.

Non-migratory slip agents, used in one or more skin layers of the multi-layer films described, can include polymethyl methacrylate (PMMA). The non-migratory slip agent can have a mean particle size in the range of from about 0.5 to 8 microns, or 1 to 5 microns, or 2 to 4 microns, depending upon layer thickness and desired slip properties. Alternatively, the size of the particles in the non-migratory slip agent, such as PMMA, can be greater than 20% of the thickness of the skin layer containing the slip agent, or greater than 40% of the thickness of the skin layer, or greater than 50% of the thickness of the skin layer. The size of the particles of such non-migratory slip agent can also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes can be also contemplated.

Suitable anti-oxidants can include phenolic anti-oxidants, such as IRGANOX® 1010 (commercially available from Ciba-Geigy Company of Switzerland). Such an anti-oxidant can be generally used in amounts ranging from 0.1 to 2 wt %, based on the total weight of the layer(s) to which it can be added.

Anti-static agents can include alkali metal sulfonates, polyether-modified polydiorganosiloxanes, polyalkylphenylsiloxanes, and tertiary amines. Such anti-static agents can be used in amounts ranging from about 0.05 to 3 wt %, based upon the total weight of the layer(s).

Examples of suitable anti-blocking agents can include silica-based products such as SYLOBLOC® 44 (commercially available from Grace Davison Products of Colombia, MD), PMMA particles such as EPOSTAR™ (commercially available from Nippon Shokubai Co., Ltd. of Japan), or polysiloxanes such as TOSPEARL (commercially available from GE Bayer Silicones of Wilton, Conn.). Such an anti-blocking agent can include an effective amount up to about 3000 ppm of the weight of the layer(s) to which it can be added.

Fillers useful in this invention can include finely divided inorganic solid materials such as silica, fumed silica, diatomaceous earth, calcium carbonate, calcium silicate, aluminum silicate, kaolin, talc, bentonite, clay and pulp.

Suitable moisture and gas barrier additives can include effective amounts of low-molecular weight resins, hydrocarbon resins, particularly petroleum resins, styrene resins, cyclopentadiene resins, and terpene resins.

Optionally, one or more skin layers can be compounded with a wax or coated with a wax-containing coating, for lubricity, in amounts ranging from 2 to 15 wt % based on the total weight of the skin layer. Any conventional wax, such as, but not limited to Carnauba™ wax (commercially available from Michelman Corporation of Cincinnati, Ohio) that can be useful in thermoplastic films can be contemplated.

Surface Treatment for Substrates

One or both of the outer surfaces of the substrate (e.g., the skin layer) can be surface-treated to increase the surface energy to render the film receptive to metallization, coatings, printing inks, and/or lamination. The surface treatment can be carried out according to one of the methods known in the art including corona discharge, flame, plasma, chemical treatment, or treatment by means of a polarized flame.

Metallization for Substrates

One or both of the outer surfaces of the substrates can be metallized. Such surfaces can be metallized using conventional methods, such as vacuum metallization by deposition of a metal layer such as aluminum, copper, silver, chromium, or mixtures thereof.

If metallized, the polyolefin dispersion preferably has no oxygen containing functional groups. Since the polyolefin dispersion coating has no oxygen containing functional groups, it will not block to an aluminum metallized surface. A film with one-side having a low temperature seal coating and the other side with aluminum coating would be an ideal candidate for a single layer barrier packaging film. The metallized surface could further be coated or printed then over-coated with an over-varnish.

Top Coatings for Substrates

In one or more embodiments, one or more top coatings, such as for barrier, printing and/or processing, can be applied to an outermost surface of a substrate. In one or more embodiments, top coatings can be applied to a surface that has been coated with a polyolefin dispersion described. Such top coatings can include acrylic polymers, such as ethylene acrylic acid (EAA), ethylene methyl acrylate copolymers (EMA), polyvinylidene chloride (PVdC), poly(vinyl)alcohol (PVOH) and EVOH. The coatings are preferably applied by an emulsion coating technique, but can also be applied by co-extrusion and/or lamination.

The PVdC coatings that are suitable for use with the multi-layer films are any of the known PVdC compositions heretofore employed as coatings in film manufacturing operations, e.g., any of the PVdC materials described in U.S. Pat. No. 4,214,039, U.S. Pat. No. 4,447,494, U.S. Pat. No. 4,961,992, U.S. Pat. No. 5,019,447, and U.S. Pat. No. 5,057,177, incorporated herein by reference.

Known vinyl alcohol-based coatings, such as PVOH and EVOH, that are suitable for use with the multi-layer films invention include VINOL™ 125 or VINOL™ 325 (both commercially available from Air Products, Inc. of Allentown, Pa.). Other PVOH coatings are described in U.S. Pat. No. 5,230,963, incorporated herein by reference.

Before applying a polyolefin dispersion or top coatings, to the outer surface, the surface to be coated can be treated as described to increase its surface energy. For example, the film can be treated using flame treatment, plasma, corona discharge, film chlorination (e.g., exposure of the film surface to gaseous chlorine), treatment with oxidizing agents such as chromic acid, hot air or steam treatment, flame treatment and the like. Although any of these techniques can be effectively employed to pre-treat the film surface, a frequently preferred method can be corona discharge, an electronic treatment method that includes exposing the film surface to a high voltage corona discharge while passing the film between a pair of spaced electrodes. After treatment of the film surface, the polyolefin dispersion can be then applied thereto.

In one or more embodiments, a primer coating can be applied as a top coating to one or more surfaces of a substrate (e.g., multi-layer film). The primer can be applied to a surface before application of a polyolefin dispersion described herein or before application of another top coating. When a primer can be to be applied, the substrate can be surface treated by one of the foregoing methods. In another embodiment, the primer coating can be added to any of the polyolefin dispersions described.

Such primer materials are well known in the art and include, for example, epoxy and poly(ethylene imine) (PEI) materials. U.S. Pat. No. 3,753,769, U.S. Pat. No. 4,058,645 and U.S. Pat. No. 4,439,493, each incorporated herein by reference, disclose the use and application of such primers. The primer provides an overall adhesively active surface for thorough and secure bonding with the subsequently applied polyolefin dispersion and can be applied to a substrate by conventional solution coating means, for example, by roller application.

Hermetic Seals formed from Coated Substrates

In one or more embodiments, the multi-layered film described can be formed into a package adapted to contain a product. In one or more embodiments, a first portion of the multi-layered film can be sealed under suitable sealing conditions to a second portion thereof to form a hermetic seal (e.g., a fin seal). In one or more embodiments, a portion of a first coated substrate can be sealed under suitable sealing conditions to a portion of a second coated substrate to form a package having a hermetic seal (e.g., a lap seal). Such suitable sealing conditions include the minimum sealing temperatures and the hot tack temperature ranges described.

Minimum Seal Temperatures

The minimum sealing temperature can be less than 70° C., or less than 65° C., or less than 60° C. at a peel strength of greater than 300 grams/inch (118 grams/cm) measured in accordance with the test methods described herein. The minimum sealing temperature can be less than 75° C., or less than 75° C., or less than 65° C. at a peel strength of greater than 500 grams/inch (197 grams/cm) measured in accordance with the test methods described herein. The minimum sealing temperature can be less than 80° C., or less than 75° C., or less than 70° C. at a peel strength of greater than 700 grams/inch (276 grams/cm) measured in accordance with the test methods described herein. The minimum sealing temperature can be less than 85° C. at a peel strength of greater than 800 grams/inch (315 grams/cm) measured in accordance with the test methods described herein.

Hot Tack Properties

As used herein, "hot tack" refers to as the ability of a sealant material (e.g. coating material or sealant layer of a multilayer film) to self-adhere above its melting point and to generate a hermetic seal between such sealant materials where the seal strength can be measured immediately following a sealing operation while the sealant materials are still in a semi-molten state as determined in accordance with the methods described herein.

The sealing conditions described include the hot tack temperature range of a hermetic seal formed from a substrate having at least one surface coated with a polyolefin dispersion, described herein. As used herein, the term "hot tack temperature range" refers to the range of temperatures in which less than 50% of a seal can be opened by a spring weight attached.

The hot tack temperature range can be greater than 90° C., or greater than 85° C., or greater than 80° C., or greater than 75° C., or greater than 70° C. at a spring weight of 20 grams/cm measured in accordance with the test methods described herein. The hot tack temperature range can be greater than 80° C., or greater than 75° C., or greater than 70° C., or greater than 65° C., or greater than 60° C., or greater than 55° C., or greater than 50° C. at a spring weight of 40 grams/cm measured in accordance with the test methods described herein. The hot tack temperature range can be greater than 80° C., or greater than 70° C., or greater than 60° C., or greater than 50° C., or greater than 40° C. at a spring weight of 60 grams/cm measured in accordance with the test methods described herein.

Testing Methods

As used herein, the phrase "coefficient of friction" or "COF" refers to the kinetic film coefficient of friction to a specified surface. The coefficient of friction (COF) can be determined following ASTM 1894 with 10 seconds of measurement time using a Thwing-Albert (Model 225-1) slip-peel equipment.

Density can be measured according to ASTM D-1505 test method.

The procedure for Differential Scanning Calorimetry (DSC) can be described as follows. From about 6 to 10 mg of a sheet of the polymer pressed at approximately 200 to 230° C. can be removed with a punch die. This can be annealed at room temperature for at least 2 weeks. At the end of this period, the sample can be placed in a Differential Scanning Calorimeter (TA Instruments Model 2920 DSC) and cooled to about −50 to −70° C. The sample can be heated at 20° C./min to attain a final temperature of about 200 to 220° C. The thermal output can be recorded as the area under the melting peak of the sample which can be typically peaked at about 30 to 175° C. and occurs between the temperatures of about 0 and 200° C. can be a measure of the heat of fusion expressed in Joules per gram of polymer. The melting point can be recorded as the temperature of the greatest heat absorption within the range of melting of the sample.

Mean particle size can be determined from the statistical volume distributions obtained from Beckman Coulter LS type Particle Size Analyzer.

Melt Flow Rate (MFR) can be measured at 2.16 kg., 190° C. with a 1 minute preheat on the sample to provide a steady temperature for the duration of the experiment. MFR can also be measured according to ASTM D-1238. (Usually for PE, we measure MI at 190° C. with a 5 minute preheat on the sample. For PP we measure MFR at 230C with 6 minutes preheat.)

Hermetic seals can be formed using sealing devices such as a LAKO™ Heat Sealer (Model SL-10), RDM Laboratory Heat Sealer (Model HT-1000), and a FUJI™ Heat Sealer (Model Alpha V).

Hermetic seals using the RDM Laboratory Heat Sealer HT-1000 (commercially available from RDM Test Equipment Co. of Hertfordshire, United Kingdom) can be prepared as follows: the flat jaws of the RDM Laboratory Heat Sealer are heated to the specified temperature and the films to be sealed are inserted into the flat jaws and the seal can be formed at a jaw pressure of 50 p.s.i. (0.345 MPa or 3.45 bars) for 0.2 seconds.

The seal strength of hermetic seals formed from flexible barrier materials can be determined according to the standard testing method of ASTM F 88-06.

The LAKO™ Heat Sealer (Model SL-10) (commercially available from Lako Tool & Manufacturing, Inc. of Perrysburg, Ohio) can be used to form a seal and evaluate its seal strength. The LAKO™ Heat Sealer can be an automated film testing device that can be capable for forming a film seal, determining the seal strength, and generating a seal profile from film samples. The operating range can be from ambient to 199° C., sealing pressure of 0.04 to 2.69 MPa, and a dwell time of 0.2 to 20 seconds.

The seal strength of a seal formed using a FUJI™ Heat Sealer (Alpha V) machine (commercially available from Fuji Packaging Co. Ltd. of Japan) can be determined as follows: a roll of film or film lamination can be placed on the machine. The crimp temperature can be set at or above the minimum seal temperature ("MST") of the film or film lamination. The lap and/or fin seal temperature can be set above the MST of the film or film lamination. A total of twenty empty bags measuring approximately 35.6 cm by 13.3 cm are produced at the rate 150 bags/min Two bags are randomly selected and seal strengths are measured on a Suter tester. Preferred seal strength range can be greater than 80 grams/cm.

The Brugger™ Dynamometer (Model HSG-C) (commercially available from Brugger Feinmechanix GmbH of Munich, Germany) can be used to evaluate the seal strength based on ASTM F88-06 as follows: Seals strengths are measured on 25 mm wide strips of seals. The strips are placed on both sides in each jaw and tightened with clamps. The strips have to be placed at the seal limit but without any tension to start the readings at the beginning of the sealing area. During the reading, the sample can be maintained without any constraint perpendicularly to the jaws direction. Seal strength values correspond to the "F-max" maximum values.

Minimum seal temperature (MST) can be determined as follows: heat seals are formed using one of the above heat sealers at temperatures that are raised incrementally. The minimum seal temperature can be reached when one temperature yields a seal value of less than a specified grams/cm. peel force and the next temperature yields a seal value of greater than or equal to the specified grams/cm. peel force. Using the RDM Laboratory Heat Sealer Model HT-1000, for example, the temperatures can be increased from 45 to 85° C., in 5° C. increments. The specified peel force of the LAKO™ Heat Sealer and the FUJI™ Heat Sealer can be 80 grams/cm. For the Brugger Heat Sealer, the specified peel force can be 300 grams/cm.

MST can also be evaluated on a HFFS packaging machine operating at a fixed packaging speed. MST of a seal formed using a Jaguar Record Model HFFS packaging machine (commercially available from Jaguar Packaging Systems, Inc. of Lewiston, N.Y.) can be determined as follows: a film or film lamination can be placed on the machine. The Jaguar Record machine can be operated at 76 m/min (250 ft/min). The pressure applied by the jaws of the Jaguar Record machine when making seals increases as the thickness of the film increases. Packages are formed having one or more heat seals and can or can not contain a product. The minimum seal temperature of the packages form are determined in accordance with the methods described herein.

Hot tack performance can be determined using a Otto Brugger™ Hot Tack machine (Model HSG ETK) (commercially available from Brugger Feinmechanix GmbH of Munich, Germany) or a LAKO™ Heat Sealer (Model SL-10), described above, as follows: new heat seals are formed using one of the above-described heat sealers at temperatures that are raised incrementally.

For measurements with the Otto Brugger™ Hot Tack equipment, hot tack measurements based on ASTM D3706 were determined as follows: seals are formed around a bended springs. Typical spring weights are 20 grams/cm, 40 grams/cm, or 60 grams/cm. The hot tack temperature range can be recorded as the temperature in which less than 50% of the seal can be opened by the strength of the bended spring. Preferred hot tack range temperatures are: greater than 70° C. for a 20 grams/cm spring, or greater than 50° C. for a 40 grams/cm spring or greater than 20° C. for a 60 grams/cm spring.

For measurements with the Lako™ Heat Sealer, immediately after seal formation, the seal can be automatically peeled by an integrated dynamometer (Time between sealing and peeling can be less than 1 sec). In this case, the hot tack temperature range can be recorded as the range temperature in which the minimum seal strength can be 150 g/inch (59 g/cm).

EXAMPLES

The present invention will be further described with reference to the following non-limiting examples. Twelve untreated OPP films (Examples 1-12) were coated on (in)-line, according to one or more embodiments described. Six comparative examples (C1-C6) are also provided. C1 and C2 were coated off-line, and C3-C6 had no coating. The off-line coated films (C1 and C2) exhibited high haze and low gloss, whereas, the on-line coated films (Examples 1-16) showed significantly improved optical properties, low seal initiation temperature, as well as good seal strength.

In Examples 1-12, different skins resins were compared as the surface for in-line POD coating. See, Table 1 below. Three POD coatings were used and were based on the EG8200 resin with a standard surfactant. To prepare the first dispersion, 100 parts by weight of a thermoplastic ethylene/1-octene copolymer with octene content of about 38 weight percent, a density of about 0.87 g/cc (ASTM D-792) and a melt index of about 5 g/10 minutes (as determined according to ASTM D-1238 at 190° C. and 2.16 kg) a Mw/Mn of about 2.0, and a melting point of about 60° C. (as determined by DSC at a scanning rate of about 10° C. per minute), commercially available from The Dow Chemical Company as AFFINITY™ EG8200 polyolefin elastomer, is melt kneaded at 150° C. in a twin screw extruder at a rate of 4.8 kg/hr along with 3.6 parts by weight of a high erucic acid ester rapeseed oil (dispersing agent) having an experimentally determined acid value of 97 mg KOH/g, manufactured by Montana Specialty Mills as HEAR oil.

To the melt kneaded resin/dispersing agent above, a 13.9 wt % aqueous solution of potassium hydroxide, is continuously fed into a downstream injection port at a rate 0.12 kg/hr (which equates to 2.4 wt % of the total mixture). This aqueous dispersion is subsequently diluted in a two step process with water initially at a rate of 0.9 kg/hr, and secondly additional water added at a rate of 2.3 kg/hr before exiting the extruder. To further dilute the resulting dispersion, additional water is added at a rate of 0.8 kg/hr after the mixture exited the extruder. An aqueous dispersion having a solids content of 55.0 wt % at pH 10.3 with a Brookfield viscosity of 95 cP (RV3 spindle, 20.4° C., 50 rpm) is obtained. The dispersed polymer phase measured by a Coulter LS230 particle analyzer consisted of an average volume diameter of 2.26 microns and a particle size distribution (Dv/Dn) of 3.42.

To prepare the second dispersion, 100 parts by weight of a thermoplastic ethylene/1-octene copolymer with octene content of about 38 weight percent, a density of about 0.87 g/cc (ASTM D-792) and a melt index of about 5 g/10 minutes (as determined according to ASTM D-1238 at 190° C. and 2.16 kg) a Mw/Mn of about 2.0, and a melting point of about 60° C. (as determined by DSC at a scanning rate of about 10° C. per minute), commercially available from The Dow Chemical Company as AFFINITY™ EG8200 polyolefin elastomer, is melt kneaded at 150° C. in a twin screw extruder at a rate of 4.8 kg/hr along with 3.6 parts by weight of a high erucic acid ester rapeseed oil (dispersing agent) having an experimentally determined acid value of 97 mg KOH/g, manufactured by Montana Specialty Mills as HEAR oil.

To the melt kneaded resin/dispersing agent above, a 16.3 wt % aqueous solution of potassium hydroxide, is continuously fed into a downstream injection port at a rate 0.10 kg/hr (which equates to 2.0 wt % of the total mixture). This aqueous dispersion is subsequently diluted in a two step process with water initially at a rate of 0.9 kg/hr, and secondly additional water added at a rate of 2.3 kg/hr before exiting the extruder. To further dilute the resulting dispersion, additional water is added at a rate of 1.0 kg/hr after the mixture exited the extruder. An aqueous dispersion having a solids content of 53.9 wt % at pH 11.0 with a Brookfield viscosity of 75 cP (RV3 spindle, 20.8° C., 50 rpm) is obtained. The dispersed polymer phase measured by a Coulter LS230 particle analyzer consisted of an average volume diameter of 2.36 microns and a particle size distribution (Dv/Dn) of 3.42.

To prepare the third dispersion, 100 parts by weight of a thermoplastic ethylene/1-octene copolymer with octene content of about 38 weight percent, a density of about 0.87 g/cc (ASTM D-792) and a melt index of about 5 g/10 minutes (as determined according to ASTM D-1238 at 190° C. and 2.16 kg) a Mw/Mn of about 2.0, and a melting point of about 60° C. (as determined by DSC at a scanning rate of about 10° C. per minute), commercially available from The Dow Chemical Company as AFFINITY™ EG8200 polyolefin elastomer, is melt kneaded at 150° C. in a twin screw extruder at a rate of 4.8 kg/hr along with 3.1 parts by weight of a high erucic acid ester rapeseed oil (dispersing agent) having an experimentally determined acid value of 97 mg KOH/g, manufactured by Montana Specialty Mills as HEAR oil.

To the melt kneaded resin/dispersing agent above, a 16.3 wt % aqueous solution of potassium hydroxide, is continuously fed into a downstream injection port at a rate 0.10 kg/hr (which equates to 2.0 wt % of the total mixture). This aqueous dispersion is subsequently diluted in a two step process with water initially at a rate of 0.9 kg/hr, and secondly additional water added at a rate of 1.8 kg/hr before exiting the extruder. To further dilute the resulting dispersion, additional water is added at a rate of 1.0 kg/hr after the mixture exited the extruder. An aqueous dispersion having a solids content of 56.6 wt % at pH 10.6 with a Brookfield viscosity of <75 cP (RV3 spindle, 20.5° C., 50 rpm) is obtained. The dispersed polymer phase measured by a Coulter LS230 particle analyzer consisted of an average volume diameter of 5.21 microns and a particle size distribution (Dv/Dn) of 7.65.

About 25 micron of co-extruded OPP films were produced. The orientation ratios were 5×8. The POD coating was applied to a MD stretched PP sheet, and then sent into a TD oven through a tenter frame. For the coating station, a 72-Quad gravure roll was used. The gravure roll was run as FDG (forward direct Gravure) or RDG (reverse direct gravure) mode. Water was evaporated in the TD oven, and the film was stretched to form a finished film with a layer of polyolefin coating tightly adhered to it.

For stretching oriented polypropylene (OPP) film in the TD oven, the oven temperature was set at about 155° C. The melting point of the PP films was about 160° C. At this temperature, the dried ethylene alpha-olefin copolymer coating became very soft or even molten. The particle size of the POD became a non-factor. The finished film was very clear and glossy. The heating effect from the TD oven also gave greatly improved coating adhesion to the OPP base film.

TABLE 1

| EX. | POD Coating | POD avg. Particle Size (micron) | POD % solid | POD viscosity (cP) | Skin Layer | Coating Method | Coating Adhesion** | Haze | Gloss | MST (° F.), 200 g |
| --- | --- | --- | --- | --- | --- | --- | --- | --- | --- | --- |
| 1 | A | 2.3 | 45 | 95 | LDPE | in-line | N/A | 3.4 | 97 | 148 |
| 2 | A | 2.3 | 40 | 95 | LDPE | in-line | very high | 1.8 | 87 | 157 |
| 3 | B | 2.4 | 40 | 75 | LDPE | in-line | medium | 2.7 | 84 | 166 |
| 4 | B | 2.4 | 40 | 75 | LDPE | in-line | N/A | 3.8 | 78 | 169 |
| 5 | A | 2.3 | 35 | 95 | MDPE | in-line | very high | 1.0 | 89 | 146 |
| 6 | B | 2.4 | 35 | 75 | MDPE | in-line | very high | 2.0 | 87 | 155 |

TABLE 1-continued

| EX. | POD Coating | POD avg. Particle Size (micron) | POD % solid | POD viscosity (cP) | Skin Layer | Coating Method | Coating Adhesion** | Haze | Gloss | MST (° F.), 200 g |
|---|---|---|---|---|---|---|---|---|---|---|
| 7 | C | 5.2 | 40 | <75 | EPB | in-line | medium-high | 1.2 | 89 | 142 |
| 8 | B | 2.4 | 35 | 75 | EPB | in-line | medium-high | 1.5 | 87 | 146 |
| 9 | C | 5.2 | 40 | <75 | EP | in-line | Med-hi | 1.0 | 89 | 139 |
| 10 | C | 5.2 | 40 | <75 | EP | in-line | N/A | 1.1 | 90 | 144 |
| 11 | B | 2.4 | 35 | 75 | EP | in-line | N/A | 1.1 | 89 | 145 |
| 12 | B | 2.4 | 35 | 75 | EP | in-line | very high | 0.9 | 89 | 141 |
| C1 | C | 5.2 | 35 | <75 | EP | off-line | medium-low | 18.5 | 47 | 150 |
| C2 | A | 2.3 | 35 | 95 | EP | off-line |  | 17.7 | 46 | 146 |
| C3 | No Coating |  |  |  | LDPE | in-line | N/A | 2.8 | 83 | 0 (No seal) |
| C4 | No Coating |  |  |  | MDPE | in-line | N/A | 1.0 | 92 | 0 (No seal) |
| C5 | No Coating |  |  |  | EPB | in-line | N/A | 2.3 | 86 | 0 (No seal) |
| C6 | No Coating |  |  |  | EP | in-line | N/A | 1.2 | 88 | 0 (No seal) |

**coating adhesion as rated by rubbing with MEK to remove it.

As shown in Table 1, each example according to one or more embodiments described (Ex. 1-12) exhibited substantially improved haze, gloss and coating adhesion compared to the comparative examples that were coated off-line (C1 and C2) or not coated at all (C3-C6). The comparative examples that were not coated (C3-C6) showed acceptable haze and gloss as would be expected, but had no ability to seal (0° F. MST). In stark contrast, each example according to one or more embodiments described (Ex. 1-12) surprisingly exhibited substantially improved haze, gloss and coating adhesion, in addition to excellent sealing temperatures (139-169° F.); whereas, the off-line comparative examples (C1-C2) exhibited poor haze and gloss, but acceptable sealing temperature. Most notably, Example 9 and comparative example C1 each had a POD particle size of about 5.2 microns and a skin layer of EP; yet, Example 9 that was coated in-line exhibited surprising excellent adhesion with significantly improved haze (1.0) and gloss (89) compared to C1 that was coated off-line (haze=18.5; gloss=46).

Accordingly, the in-line coated films exhibited superior adhesion, haze, and gloss over the off-line coated films. The in-line coating process also avoided additional steps like further heating and drying which are encountered in off-line coating processes. Therefore, the in-line coating process can provide a significant commercial advantage due to the reduction in the number of process steps employed in addition to a more significantly desirable film for package applications.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for producing a coated biaxially oriented film consisting of:
   orienting a base polypropylene film with a skin layer in a first direction to provide an uniaxially oriented polypropylene film;
   coating, in-line with orienting in a second direction, at least a portion of the uniaxially oriented polypropylene film on the skin layer with a polyolefin dispersion to produce a coated uniaxially oriented film, wherein the polyolefin dispersion is an ethylene/1-octene copolymer blended with up to 3.6 parts by weight of a fatty acid; and
   orienting the coated uniaxially oriented film in the second direction at a temperature sufficient to stretch and anneal the coated uniaxially oriented film so as to provide a coated biaxially oriented film having greater than 80% gloss and a Haze of less than 5%, wherein a temperature for orienting in the second direction is greater than the melting temperature of the ethylene/1-octene copolymer;
   wherein the coated biaxially oriented film produced therefrom can be heat sealed to at least a portion of itself or at least a portion of another film at a heat seal temperature of less than 80° C.

2. The method of claim 1, wherein the coated biaxially oriented film is a clear film having less than 5% haze.

3. The method of claim 1, wherein the temperature is about 280 to 340° F.

4. The method of claim 1, wherein the polyolefin dispersion comprises an aqueous solution comprising at least one thermoplastic resin, at least one dispersing agent and water, wherein the dispersion has a pH of less than 12.

5. The method of claim 4, wherein the dispersing agent is selected from the group consisting of carboxylic acids, salts of at least one carboxylic acid, carboxylic acid esters, salts of the carboxylic acid esters, alkyl ether carboxylates, petroleum sulfonates, sulfonated polyoxyethylenated alcohol, sulfated or phosphate polyoxyethylenated alcohols, polymeric ethylene oxide/propylene oxide/ethylene oxide dispersing agents, primary and secondary alcohol ethoxylates, alkyl glycosides, alkyl glycerides, derivatives thereof, and combinations thereof.

6. The method of claim 4, the dispersing agent is a copolymer comprised of ethylene-acrylic acid, salts of ethylene-acrylic acid, methacrylic acid, salts of methacrylic acid, and combinations thereof.

7. The method of claim 1, wherein the polyolefin dispersion has average volume diameter particle size less than 7 microns.

8. The method of claim 1, wherein the first direction is a machine direction and the second direction is a transverse direction or the first direction is in a transverse direction and the second directions is a machine direction.

9. The method of claim 1, wherein orienting the coated uniaxially oriented film in a transverse direction is performed at a temperature of 162° C. or less.

10. The method of claim 1, wherein orienting the coated uniaxially oriented film in a transverse direction is performed at a temperature sufficient to increase adhesion between the polyolefin dispersion and the uniaxially orientated polypropylene film.

11. The method of claim 1, wherein the base polypropylene film with a skin layer comprises a core layer and a first skin layer.

12. The method of claim 11, wherein the first skin layer comprises one or more anti-blocking agents.

13. The method of claim 11, wherein the first skin layer comprises a voiding agent selected from the group consisting of polyamides, polybutylene terephthalate, polyesters, acetals, acrylic resins, solid preformed glass particles, hollow preformed glass particles, metal particles, ceramic particles, calcium carbonate, cyclic olefin polymers, cyclic olefin copolymers, silicon dioxide, aluminum silicate, magnesium silicate and mixtures thereof.

14. The method of claim 11, wherein the core layer comprises a voiding agent selected from the group consisting of polyamides, polybutylene terephthalate, polyesters, acetals, acrylic resins, solid preformed glass particles, hollow preformed glass particles, metal particles, ceramic particles, calcium carbonate, cyclic olefin polymers, cyclic olefin copolymers, silicon dioxide, aluminum silicate, magnesium silicate and mixtures thereof.

15. The method of claim 11, wherein the core layer comprises one or more additives selected from the group consisting of phosphorescence producing agents, reflective agents, coloring agents that are non-opaque producing pigments and dyes.

16. The method of claim 1, wherein the base polypropylene film with a skin layer comprises at least one core layer disposed between a first skin layer and a second skin layer.

17. The method of claim 16, wherein the first skin layer is patterned or non-continuous.

18. The method of claim 16, wherein the first skin layer comprises one or more anti-blocking agents and the second skin layer comprises one or more antiblocking agents, slip additives or both.

19. The method of claim 18, further comprising at least partially disposing a metal on the second skin layer.

20. The method of claim 19, wherein the metal comprises aluminum.

21. The method of claim 16, wherein the second skin layer is suitable for a surface treatment comprising flame, corona, plasma, metallization, coating, printing, or combinations thereof.

22. The method of claim 16, wherein the core layer is selected from the group consisting of propylene homopolymers, ethylene homopolymers, high density polyethylene (HDPE), medium density polyethylenes (MDPE), low density polyethylene (LDPE), linear low density polyethylene (LLDPE), very low density polyethylene (VLDPE), isotactic polypropylene, syndiotactic polypropylene, EPB terpolymers, EP copolymers, propylene-butylene copolymers, amorphous polyamides, EVOH copolymers, derivatives thereof, and blends thereof.

23. The method of claim 16, wherein the second skin layer is metallized to provide an appearance that is shiny, metallic, colored, reflective, holographic, phosphorescent, or combinations thereof.

24. A method for producing a coated biaxially oriented film, consisting of:
orienting an untreated polypropylene base film with a skin layer in a first direction and at a first temperature to provide an untreated uniaxially oriented polypropylene film;
wherein the untreated polypropylene base film with a skin layer comprises at least one skin layer on a first side of a polypropylene core layer and at least one skin layer on a second side of the polypropylene core layer, the base film oriented;
coating, in-line with orienting in a second direction, at least a portion of the untreated uniaxially oriented polypropylene film on a skin layer with a polyolefin dispersion to produce a coated uniaxially oriented film, wherein the polyolefin dispersion is an ethylene/1-octene copolymer blended with up to 3.6 parts by weight of a fatty acid, the polyolefin dispersion having an average particle size within the range of from about 2.3 microns to 5.2 microns; and
orienting the coated uniaxially oriented film in the second direction and at a second temperature sufficient to stretch and anneal the coated uniaxially oriented film so as to provide a coated biaxially oriented film having greater than 80% gloss and a Haze of less than 5%, wherein the second temperature is greater than the first temperature and greater than the melting temperature of the ethylene/1-octene copolymer in the polyolefin dispersion;
wherein the coated biaxially oriented film produced therefrom can be heat sealed to at least a portion of itself or at least a portion of another film at a heat seal temperature of less than 80° C.

25. The method of claim 24, wherein the coated biaxially oriented film is a clear film having less than 5% haze.

26. The method of claim 24, wherein the second temperature is about 280 to 340° F.

27. The method of claim 24, wherein the polyolefin dispersion comprises aqueous solution comprising at least one thermoplastic resin, at least one dispersing agent and water, wherein the dispersion has a pH of less than 12.

28. The method of claim 24, wherein the polyolefin dispersion has average volume diameter particle size less than 7 microns.

29. The method of claim 24, wherein the first direction is a machine direction and the second direction is a transverse direction or the first direction is a transverse direction and the second direction is a machine direction.

30. The method of claim 24, wherein orienting the coated uniaxially orientated film in a transverse direction is performed at a temperature of 162° C. or less.

31. The method of claim 24, wherein orienting the coated uniaxially orientated film in a transverse direction is performed at a temperature sufficient to increase adhesion between the polyolefin dispersion and the uniaxially orientated polypropylene film.

32. The method of claim 31, further comprising at least partially disposing a metal on at least one skin layer.

33. The method of claim 24, wherein at least one skin layer comprises one or more anti-blocking agents.

34. The method of claim 33, wherein the metal comprises aluminum.

35. The method of claim 24, wherein at least one skin layer is suitable for a surface treatment comprising metallization, coating, printing, or combinations thereof.

36. The method of claim 24, wherein at least one skin layer comprises a voiding agent selected from the group consisting of polyamides, polybutylene terephthalate, polyesters, acetals, acrylic resins, solid preformed glass particles, hollow preformed glass particles, metal particles, ceramic particles, calcium carbonate, cyclic olefin polymers, cyclic olefin copolymers, silicon dioxide, aluminum silicate, magnesium silicate and mixtures thereof.

37. The method of claim 24, wherein the polypropylene core layer comprises a voiding agent selected from the group consisting of polyamides, polybutylene terephthalate, polyesters, acetals, acrylic resins, solid preformed glass particles, hollow preformed glass particles, metal particles, ceramic particles, calcium carbonate, cyclic olefin polymers, cyclic olefin copolymers, silicon dioxide, aluminum silicate, magnesium silicate and mixtures thereof.

38. The method of claim 24, wherein the polypropylene core layer comprises one or more additives selected from the group consisting of phosphorescence producing agents, reflective agents, coloring agents that are non-opaque producing pigments and dyes.

39. The method of claim 24, wherein at least one skin layer is patterned or non-continuous.

40. The method of claim 24, wherein at least one skin layer is metallized to provide an appearance that is shiny, metallic, colored, reflective, holographic, phosphorescent, or combinations thereof.

* * * * *